Aug. 4, 1925.
G. H. BRAWNER
PISTON RING
Filed Feb. 16, 1924
1,548,179
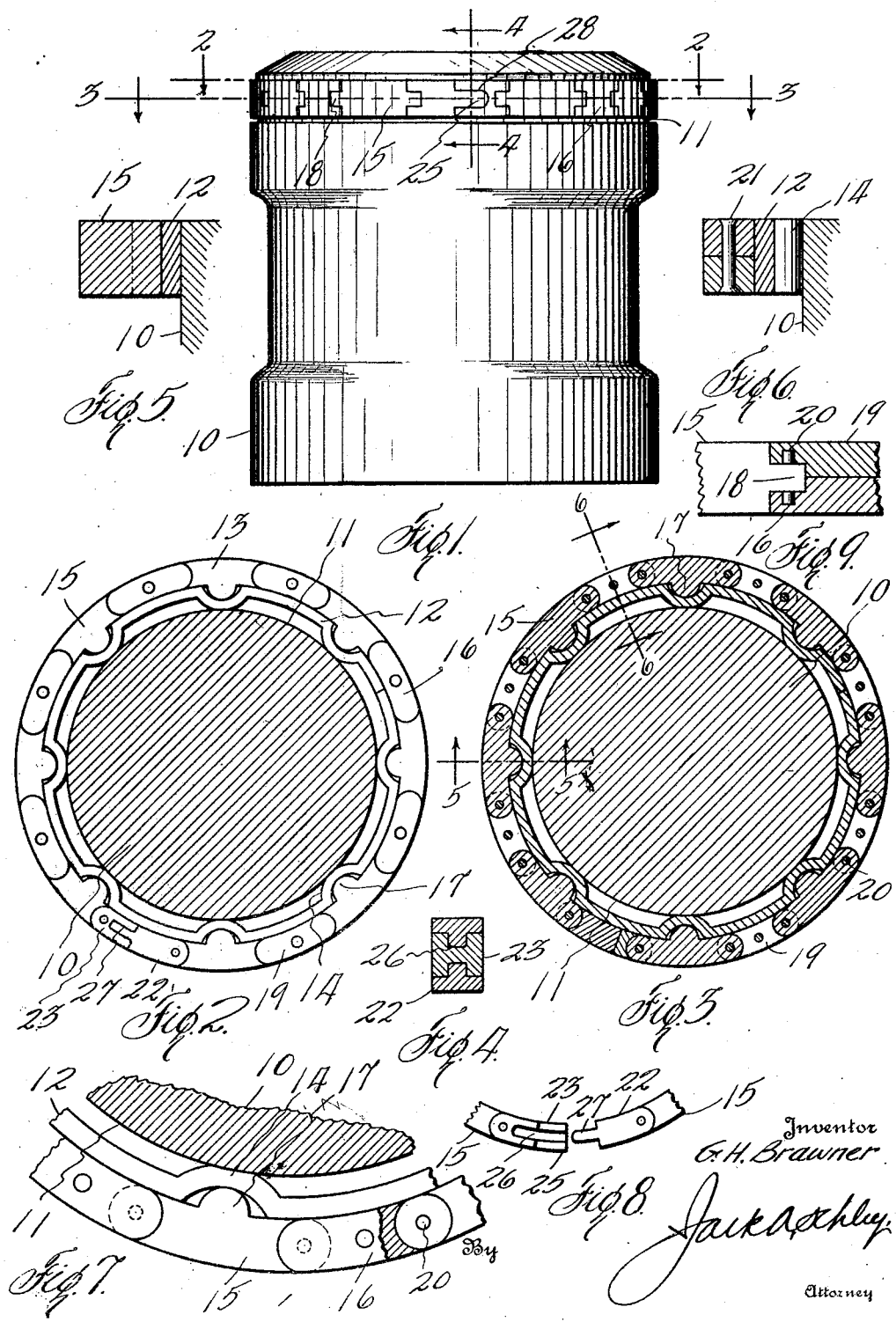
Inventor
G. H. Brawner
By Jack A. Ashley
Attorney Patented Aug. 4, 1925.

1,548,179

UNITED STATES PATENT OFFICE.

GEORGE H. BRAWNER, OF DALLAS, TEXAS, ASSIGNOR, BY DIRECT AND MESNE ASSIGNMENTS, TO BRAWMAN PISTON RING COMPANY, OF DALLAS, TEXAS, A CORPORATION OF TEXAS.

PISTON RING.

Application filed February 16, 1924. Serial No. 693,216.

*To all whom it may concern:*

Be it known that I, GEORGE H. BRAWNER, a citizen of the United States of America, residing at Dallas, in the county of Dallas and State of Texas, have invented certain new and useful Improvements in Piston Rings, of which the following is a specification.

This invention relates to new and useful improvements in piston rings.

In many types of internal combustion motors and steam engines the cylinders wear and become elliptical. A slight variation from a true circle will often cause the piston ring to be spaced from the cylinder wall at some point on its periphery, thus permitting a compression leak as well as allowing an excess passage of oil. Many types of piston rings have been developed and have proven more or less satisfactory; however I have been unable prior to my invention to find a ring which would give satisfactory results in badly worn cylinders in which the walls have been worn until the cylinder is egg-shaped.

The object of my invention is to provide an articulated piston ring designed to conform to the contour of any cylinder whether circular, elliptical or otherwise irregular in cross-sectional shape.

A further object is to provide a piston ring which will eliminate oil pumping and compression leaking in cylinders worn to various degrees.

Another object is to provide a leak-proof joint for this type of ring arranged to compensate the variations in the shape of the ring.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a side elevation of a piston equipped with a ring constructed in accordance with my invention, Fig. 2 is a cross-sectional view on the line 2—2 of Fig. 1.

Fig. 3 is a cross-sectional view on the line 3—3 of Fig. 1,

Fig. 4 is an enlarged cross-section on the line 4—4 of Fig. 1,

Fig. 5 is an enlarged cross-section on the line 5—5 of Fig. 3;

Fig. 6 is an enlarged cross-section on the line 6—6 of Fig. 3,

Fig. 7 is an enlarged detail of a portion of the ring,

Fig. 8 is a detail of the lock, and

Fig. 9 is a sectional detail of the joint between the segments.

In the drawings the numeral 10 designates a piston which may be of any suitable construction. In the upper end of the piston is cut a circumferential groove 11 which is somewhat deeper than the usual ring groove and therefore the piston must have more stock at this point than is usually cast in a piston.

My improved ring comprises two concentric members, an inner member or cradle 12 and an outer ring member or annulus 13. The cradle is made of spring steel and acts as a seat for the annulus as well as an expander for holding the same in engagement with the walls of the cylinder. The cradle is split so that it may be spread to place it in the groove 11 and is formed with concavo-convex seats 14 directed radially inwardly in regular spaced order. These seats engage the inner or back wall of the groove when the cradle is fully compressed.

The annulus 13 which corresponds to the ordinary ring is composed of links or segments 15 and 16 respectively, each having its outer face finished on the same radius. Each segment 15 has an inwardly directed boss or shoe 17 on its inner side engaging in one of the seats 14, but finished on a shorter radius so as to roll or rock in said seat as the parts are expanded or compressed. The segments 15 have lugs 18 at each end which are reduced in thickness and rounded on their outer ends.

The segments 16 are made in two parts or upper and lower sections, each having on ear 19 at each end overlapping the lugs as is shown in Figs. 1 and 9. The segments 16 are rounded between their ears to receive the rounded ends of the lugs 18 as is best shown in Figs. 3 and 7. The lugs carry pins 20 engaging in the ears, whereby the segments are hinged together. The sections of the segments 16 are fastened together by countersunk rivets 21 (Fig. 6). This construction provides a concealed pivoted connection between the segments and fastens the joints against disconnection. The upper and lower surfaces of the segments are flush and smooth.

In order to fasten the ends of the annulus together, I pivot to one end segment 15, a female link 22 and to the other end segment 15, a male link 23, by means of pins 24. The parts are proportioned so as to preserve the spacing of the shoes 17. These links form a positive lock which is leak-proof. The male link 23, as is shown in Figs. 1, 4 and 8, has a central tongue 25 provided with grooves 26 on its upper and under surfaces and these grooves extend into the link proper. The link 22 has a pair of spaced fingers 27 and socket 28 on each side, the said fingers straddling the tongue and sliding into the grooves 26, while the tongue is received between the fingers and in the sockets 28. This makes a joint that permits of radial movement of the annulus without becoming disengaged.

It will be seen that the articulated annulus will readily conform itself to the irregular curves of the cylinder wall. The cradle will expand the annulus and the ring will seat efficiently and prevent leakage and loss of compression.

Various changes in the size and shape of the different parts, as well as modifications and alterations may be made within the scope of the appended claims.

What I claim, is:

1. A piston ring comprising a resilient annular cradle having seats, and an articulated annulus surrounding the cradle and having shoes engaging in said seats and circumferentially movable relatively of the cradle.

2. In a piston ring, an annulus composed of relatively short links joined together as in a chain, and an expanding element within the annulus.

3. In a piston ring, an annulus composed of relatively short links having intermeshing ends pivoted together, a slip joint connecting the ends of the annulus, and a resilient concentric expanding member within the annulus.

4. In a piston ring, an annulus formed of a plurality of relatively short links pivoted together, some of said links having inwardly extending shoes, and a concentric expanding member within the annulus upon which the shoes bear.

5. In a piston ring, an annulus composed of relatively short links, alternate links being composed of two portions overlapping and pivoted to the intermediate links, and an expanding member within the annulus.

In testimony whereof I affix my signature.

GEORGE H. BRAWNER.